3,361,579
METHOD OF PREPARING A STABLE MEAT-CURING COMPOSITION AND PRODUCT PRODUCED THEREBY
Louis Sair, Evergreen Park, Ill., assignor to The Griffith Laboratories, Inc., Chicago, Ill., a corporation of Illinois
No Drawing. Filed Jan. 12, 1967, Ser. No. 608,752
3 Claims. (Cl. 99—222)

ABSTRACT OF THE DISCLOSURE

Because ene-diol compounds are incompatible with alkali-metal nitrite, compositions containing both have each isolated from the other by separately including at least one without the other in polycrystalline particles which predominate in sodium chloride crystals.

---

This application is a continuation-in-part of Ser. No. 337,175, filed Jan. 13, 1964, now abandoned.

Cross-reference to related applications

The pending application of applicant jointly with another, Ser. No. 576,862, filed Sept. 2, 1966, discloses polycrystalline particles predominating in sodium chloride crystals and containing meat-curing salt crystals including alkali-metal nitrate, which product can be one component of the product here claimed. Said polycrystalline particles are referred to in said application as having adherent or bonded sodium chloride crystals, which entrap or encapsulate the curing salt crystals.

Background of the invention (1) *Field of the invention.*—The invention relates to dry prepared compositions containing the principal ingredients used for the nitrite-curing of meat, particularly in the preparation of sausage emulsions. Meat processers purchase the prepared compositions and may add seasonings and other ingredients, and possibly more sodium chloride, or nitrite or ene-diol compound.

(2) *Description of prior art.*—In my U.S. Patent No. 2,828,212, there are described numerous compositions containing nitrite salt and an ene-diol compound such as an ascorbate salt with stabilizing alkaline material, exemplified by carbonates and bicarbonates of sodium and potassium, trisodium phosphate, tetrasodium pyrophosphate, and sodium tripolyphosphate. Therein are described compositions in which the nitrite salt is an individual component mechanically mixed with the remainder. Also, there are described compositions in which the nitrite salt is carried by a crystal of sodium chloride. Such a crystal is obtained by flash-drying a solution of sodium chloride containing a small amount of a nitrite salt with or without a nitrate salt. Such flash-dried product must contain at least 80% of sodium chloride, to prevent individual crystals of nitrite and any nitrate salts. A preferred commercial formulation is 90% sodium chloride, 6% sodium nitrite and 4% sodium nitrate.

Such a flash-dried salt is a mass of very fine crystals. The flash-drying process results in the occlusion of trace amounts of moisture. According to said patent, an ascorbate salt is mechanically mixed with such a flash-dried composition containing sodium nitrite and with an alkaline agent to stabilize the composition. The fine grain size of the nitrite-carrying sodium chloride crystals, especially when moisture is available, effects reaction between the nitrite and the ascorbate salt, unless stabilizing alkaline material is present.

Summary of the invention

According to the present invention, a composition useful in curing meat and containing sodium chloride, alkali-metal nitrite with or without alkali-metal nitrate, and an ene-diol compound such as a water-soluble salt of an isomer of ascorbic acid may be made commercially stable for useful periods of time without a stabilizing alkaline agent, or stable for longer periods of time when an alkaline agent is present. This is accomplished by forming polycrystalline particles predominating in adherent or bonded sodium chloride crystals, which polycrystalline particles house or trap either the ene-diol compound or the nitrite salt, the one without the other, thereby to isolate one from the other and avoid reactive contact.

Objects and description

It is, therefore, the object of the present invention to provide stable meat-curing salt compositions containing alkali-metal nitrite and an ene-diol compound, with or without stabilizing alkaline material.

A particular object of the invention is to incorporate all of one of the adverse reacting ingredients, without the other, in polycrystalline particles each of which is predominantly sodium chloride.

The present invention is based upon the discovery that a composition consisting essentially of alkali-metal nitrite with or without alkali-metal nitrate, and a water-soluble salt of an isomer of ascorbic acid, is stable with respect to these reactive ingredients when one of them without the other is a component in a minor proportion in a polycrystalline particle which is predominantly sodium chloride. For commercial purposes, the preferred embodiment is to incorporate the nitrite salt in the polycrystalline particle, and such particles are substantially uniform in composition. This is readily achieved when the particles have a particle-size-distribution such that substantially all pass through a 10-mesh screen, and not over about 10% passes through a 200-mesh screen.

In the preferred form, the nitrite salt is a component of the polycrystalline particles and the ascorbate salt is present as particles per se. An alternative is to have the ascorbate salt as a component of the polycrystalline particles, and the nitrite salt present as particles per se, or as particles of said flash-dried crystals, or as particles of a fusion of alkali-metal nitrite and nitrate. Since it is the effective isolation of one reactive ingredient from the other, each of them may be separately present as a component of different polycrystalline particles.

An important consideration is the uniformity of the composition with respect especially to the content of nitrite salt. In treating meat such a composition is controlled and is used in a selected proportion by weight to the weight of the meat so that not more than a predetermined percentage of nitrite salt is added to the original weight of the meat. Accordingly, when the nitrite salt is in the polycrystalline particles it must be uniformly contained in them. For this reason the invention is illustrated by reference to the preferred compositions in which the nitrite is combined with sodium chloride in polycrystalline particles.

Another important consideration is the non-caking character of the composition. Fine-grained compositions more readily cake than coarse-grained materials by reason of the more intimate contact of the particles. In the present invention wherein said polycrystalline particles are present the said particles can be made as coarse as desired to provide long-lasting free-flowing compositions. The said fine flash-dried crystals carrying nitrite salt readily cake. These may be converted to coarser form by mechanically compacting them to caked form, and then reducing the cakes to any desired particle-size-distribution larger than the original flash-dried form, as described in U.S. Patent No. 3,164,479. The resulting polycrystalline particles may then be used as an ingredient to provide sodium chloride, sodium nitrite, and sodium nitrate for a composition by mechanically mixing with a water-soluble salt of an isomer of ascorbic acid, such as sodium erythrobate, with or without an alkaline agent as desired. The particle-size-distribution of the compacted material avoids the fineness which characterizes the flash-dried crystals, in which the nitrite content is not sufficiently isolated to be stabilized in the presence of an ascorbate salt and in the absence of stabilizing alkali.

In accordance with the preferred embodiment of the present invention, a composition is formed in which the nitrite salt is present as a component of a polycrystalline particle which is initially a plurality of smaller particles. Such smaller particles as to the nitrite salt may be individual alkali-metal nitrite salt crystals, said flash-dried sodium chloride crystals carrying nitrite salt, or particles of a mixture of alkali-metal nitrite and alkali-metal nitrate combined by fusion. U.S. Patent No. 3,164,480 describes the production of polycrystalline particles from an initial mixture of sodium chloride crystals, and alkali-metal nitrite crystals with or without alkali-metal nitrate crystals.

As long as sodium chloride, as is conventional in the art, constitutes the major proportion of such a composition, the proportions of the nitrite salt or of the ene-diol material, and their relative proportions, are not critical, since the object of the invention is to keep the nitrite separate from the ene-diol material.

The polycrystalline particles may be made in various ways. According to one way the nitrite salt is provided as the flash-dried crystals, of which the following is a typical analysis as to composition and particles size:

TABLE I

*Commercial flash-dried crystals*

| | Percent |
|---|---|
| On 100 mesh | 2 |
| On 200 mesh | 47 |
| Thru 200 mesh | 51 |

| | Percent by weight |
|---|---|
| Sodium chloride | 90 |
| Sodium nitrite | 6 |
| Sodium nitrate | 4 |

A mass of such crystals is compacted by mechanical pressure, preferably between squeeze rolls, which latter discharge sheet-like masses. Then the compacted masses in dry condition are reduced in size, preferably by spaced rolls, to a size much coarser than the initial mass, with a particle-size-distribution, for example, such that all passes a 10-mesh screen and not more than 10% passes a 200-mesh screen. Fines or oversizes may be removed for recycling.

The resulting polycrystalline particles may then be mixed with a suitable ascorbate salt without an alkaline agent so that there is little danger that the mixture will deteriorate in nitrate and ascorbic value during ordinary storage periods. When longer than usual storage times are contemplated an alkaline agent may be used as the kind shown in said U.S. Patent No. 2,828,212, of which a less amount is needed because of the polycrystalline particles.

It is not necessary to use the said flash-dried crystals to isolate nitrite salt from such an ascorbate salt. A second way is to prepare a mixture of individual crystals of sodium chloride, and an entity which is a nitrite salt or which contains a nitrite salt, such as a fusion of it with a nitrate salt. This mixture is converted to an initial mass of uniform composition. This initial mass is then compacted to polycrystalline form and then, if in caked form, is reduced to coarse granular form as above described for the composition made from the flash-dried crystals. These are then mixed with the ascorbate salt with or without an alkaline stabilizing agent.

Since one objective is to include alkali-metal nitrite salt in a relatively large particle to minimize its possible contact with the ascorbate salt, it follows that the lower the proportion of nitrite and the larger the particle-size, the less is the possibility for such contact.

It is known that alkali-metal nitrite and alkali-metal nitrate may be combined into a homogeneous mixture by fusion and cooling. Such a fusion product may be used advantageously to supply both nitrite salt and nitrate salt for the present invention, with greater advantage than using nitrite salt crystals when the initial mass is a mechanical mixture as distinguished from the flash-dried crystals.

Table II shows a composition of mechanically mixed crystals according to said U.S. Patent No. 2,828,212, used herein as a control.

TABLE II

*Control composition*

| | Parts by weight |
|---|---|
| Fine flake salt | 90.74 |
| Sodium nitrite | 3.00 |
| Sodium nitrate | 2.00 |
| Sodium bicarbonate | 2.80 |
| Sodium erythrobate | 1.46 |
| | 100.00 |

The composition is white. Any reaction between the nitrite salt and the erythorbate salt is evidenced by a yellowing of the composition, this obviously being undesired by consumers who purchase a white composition. Without the sodium bicarbonate the composition would soon yellow and lose nitrite value.

EXAMPLE 1

The commercial flash-dried crystals of Table I were compacted to cake form, then reduced in size so that all passed a 10-mesh screen and all remained on a 100-mesh screen. This was mixed with sodium chloride and sodium erythrobate.

The final composition is:

| | Parts by weight |
|---|---|
| Fine flake sodium chloride | 49.03 |
| Polycrystalline particles: | |
|     Sodium chloride | 44.50 |
|     Sodium nitrite | 3.00 |
|     Sodium nitrate | 2.00 |
| Sodium erythrobate | 1.47 |
| | 100.00 |

This composition is the same in contents of nitrite and ascorbate salt as that in Table II, the sodium bicarbonate being omitted and the physical form only being different.

After a period of 48 days both the control and the Example 1 compositions were white.

EXAMPLE 2

A mechanical mixture of commercial crystals of sodium chloride, sodium nitrite and sodium nitrate, as shown below, was mechanically compacted to cake form, then reduced to granular form such that all passed a 10-mesh screen and all remained on a 100-mesh screen. This was made into a mixture as follows:

| | Parts by weight |
|---|---|
| Fine flake sodium chloride | 86.15 |
| Polycrystalline particles: | |
|     Fine flake sodium chloride | 7.40 |
|     Sodium nitrite | 3.00 |
|     Sodium nitrate | 1.98 |
| Sodium erythrobate | 1.47 |
| | 100.00 |

This composition is the same as that of Example 1, the internal physical form of the polycrystalline particles being different.

After 48 days the composition was slightly yellow, showing that for such a period of storage time, the content of nitrite salt in polycrystalline particles was too high for this form, wherein the nitrite salt is more exposed than in Example 1, being 24% in the polycrystalline particles compared to 6% in Example 1.

EXAMPLE 3

Composition of Example 2 was modified by including in addition to the parts shown 1 part of sodium bicarbonate.

Thus, when the nitrite salt is present in suitably sized polycrystalline particles in the presence of a salt of an isomer of ascorbic acid, the stability of a composition lacking in an alkaline agent may be increased by adding alkaline agent, by increasing the size of the polycrystalline particles, by reducing the content of nitrite in such particles, and by various combinations of these. When using alkaline material the quantity may be less than that required to stabilize the composition of said U.S. Patent No. 2,828,212.

EXAMPLE 4

| | Parts by weight |
|---|---|
| Fine flake sodium chloride | 86.15 |
| Polycrystalline particles: [1] | |
|   Fine flake sodium chloride | 7.40 |
|   Sodium erythrobate | 1.47 |
| Sodium nitrite | 3.00 |
| Sodium nitrate | 1.98 |
| | 100.00 |

[1] All pass 10-mesh and all remain on 80-mesh.

In this Example 4, the nitrite salt and the nitrate salt are not present in polycrystalline form. The sodium erythrobate only is trapped in the polycrystalline particles.

For curing meat, various packers and various formulations differ in the usage of nitrite salt and of ascorbate salts, the latter being desirable, but optional. Accordingly, the invention does not involve the relative proportions of nitrite and of ene-diol compound used in curing. It pertains to the stability of compositions containing them which are made long in advance of use and which are stored until used. Any packer desiring to use such a stored composition may at the time of use, add more of nitrite or of ascorbate salt, or both, for his particular processing.

In the foregoing examples, the polycrystalline particles have from about 6 to 25% content of one of the reactive materials, being actually as follows:

Example 1—6.07% nitrite salt
Example 2—24.6% nitrite salt.
Example 3—19.9% sodium erythrobate.
Example 4—16.6% sodium erythrobate.

The polycrystalline particles of the examples have upwardly from 75% of sodium chloride crystals.

From the foregoing it is to be understood that the invention is not limited to or by the illustrative examples and explanation given above, and that numerous changes and modifications are contemplated as falling within the scope of the invention as expressed in the appended claims.

I claim:

1. The method of preparing a stable meat-curing composition which contains sodium chloride crystals, and incompatible alkali-metal nitrite salt and ene-diol compound, which comprises mutually isolating the nitrite salt and the ene-diol compound from one another by compacting to cake form a mixture comprising predominantly sodium chloride crystals and one or the other of said nitrite salt and ene-diol compound in crystal form, reducing the cake form to granular polycrystalline particles, each of said polycrystalline particles predominating in sodium chloride crystals of the composition as mutually adherent crystals, all of said polycrystalline particles together having at least some of the sodium chloride crystals of the composition and having trapped within the polycrystalline particles all the content of one or the other of said nitrite salt and said ene-diol compound whichever is used, said polycrystalline particles being substantially uniform in composition, and combining the resulting granular material with the remainder of the composition.

2. The method of preparing a stable meat-curing composition which contains sodium chloride crystals, and incompatible alkali-metal nitrite salt and ene-diol compound, which comprises mutually isolating the nitrite salt and the ene-diol compound from one another by compacting to cake form a mixture comprising predominantly sodium chloride crystals and the nitrite salt, and by separately compacting to cake form a mixture comprising predominantly sodium chloride crystals and the ene-diol compound, reducing each of the two cake forms to two sets of granular polycrystalline particles, each polycrystalline particle of each set of polycrystalline particles predominating in sodium chloride crystals of the composition as mutually adherent crystals, all of said polycrystalline particles of each set together having at least some of the sodium chloride crystals of the composition and having trapped within the polycrystalline particles all the content of that one of said nitrite salt and said ene-diol compound which is used, said polycrystalline particles of each set being substantially uniform in composition, and combining each of the reduced forms with the remainder of the composition.

3. The product of the process of claim 1.

References Cited

UNITED STATES PATENTS

| | | | |
|---|---|---|---|
| 2,054,625 | 9/1936 | Griffith | 99—222 |
| 2,145,417 | 1/1939 | Hall | 99—222 |
| 2,400,292 | 5/1946 | Dalton | 99—159 X |
| 3,052,560 | 9/1962 | Delaney | 99—159 X |

HYMAN LORD, *Primary Examiner.*